United States Patent
Van Der Schaar et al.

(10) Patent No.: US 9,866,700 B2
(45) Date of Patent: Jan. 9, 2018

(54) CONFERENCE SYSTEM AND PROCESS FOR VOICE ACTIVATION IN THE CONFERENCE SYSTEM

(71) Applicant: Robert Bosch GmbH, Stuttgart (DE)

(72) Inventors: Hans Van Der Schaar, Breda (NL); Marc Smaak, Bergen op Zoom (NL); Jochem Bonarius, Eindhoven (NL); Rene Derkx, Eindhoven (NL); Kees Janse, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 14/758,183

(22) PCT Filed: Dec. 27, 2012

(86) PCT No.: PCT/EP2012/076972
§ 371 (c)(1),
(2) Date: Jun. 26, 2015

(87) PCT Pub. No.: WO2014/101944
PCT Pub. Date: Jul. 3, 2014

(65) Prior Publication Data
US 2015/0334247 A1 Nov. 19, 2015

(51) Int. Cl.
*H04M 3/56* (2006.01)
(52) U.S. Cl.
CPC ........ *H04M 3/568* (2013.01); *H04M 2201/18* (2013.01); *H04M 2203/5072* (2013.01)
(58) Field of Classification Search
CPC .................................................. H04M 3/568
(Continued)

(56) References Cited

U.S. PATENT DOCUMENTS

| | | | | |
|---|---|---|---|---|
| 4,941,187 A | * | 7/1990 | Slater | H04M 9/001 381/74 |
| 5,204,909 A | * | 4/1993 | Cowan | H03G 3/3005 327/332 |
| 6,105,054 A | * | 8/2000 | Kawashima | H04L 12/1818 348/E7.082 |

(Continued)

FOREIGN PATENT DOCUMENTS

| | | |
|---|---|---|
| EP | 1686835 | 8/2006 |
| JP | H11331434 A | 11/1999 |

(Continued)

OTHER PUBLICATIONS

International Search Report and Written Opinion for Application No. PCT/EP2012/076972 dated Oct. 10, 2013.

*Primary Examiner* — Gerald Gauthier
(74) *Attorney, Agent, or Firm* — Michael Best & Friedrich LLP

(57) ABSTRACT

Conference systems are used for example in discussions and usually comprise a plurality of delegate units with microphones, whereby in a discussion each discussion participant uses his own delegate unit. Usually the delegate units have a switch or the like, that allows the participant in front of the delegate unit to request, that his microphone is activated, so that the speech of the participant is input in the conference system and amplified by the conference system. A conference system comprising (1) a plurality of delegate units (2), each delegate unit (2) having a microphone (5) for receiving an audio signal from a surrounding, a central service module (3) handling a plurality of contribution channels, whereby the audio output of the contribution channels contribute to an amplified audio output of the conference system (1) is proposed, whereby each delegate unit (2) is adapted to send a request for a contribution channel commit to the central service module (3), whereby the central service module (2)

(Continued)

is adapted to grant the request and to allocate a contribution channel to the requesting delegate unit (2), thus setting the requesting delegate unit i in an active state A, whereby the delegate unit (2) is adapted to trigger the request by voice activation, whereby the request is triggered in case at least a first trigger condition is fulfilled defining that the audio signal level of one of the delegate units (2) as a possible requesting delegate unit i is higher than an individual test value for each other delegate unit (2) in the active state A, whereby the individual test value is an estimated audio signal level of the possible requesting unit i resulting from an audio or speech signal provided to the other active delegate units (2).

13 Claims, 1 Drawing Sheet

(58) Field of Classification Search
USPC ............... 340/407.1; 370/260, 352, 356; 379/202.01, 406.08; 381/66, 77, 86, 106, 381/119; 704/233, 270; 709/204, 227
See application file for complete search history.

(56) References Cited

U.S. PATENT DOCUMENTS

| | | | |
|---|---|---|---|
| 7,113,992 B1* | 9/2006 | Even | H04N 7/148 348/E7.082 |
| 8,428,236 B2* | 4/2013 | Smaak | H04R 27/00 370/260 |
| 8,670,539 B2* | 3/2014 | Van Der Schaar | H04M 3/56 370/261 |
| 2002/0037004 A1* | 3/2002 | Bossemeyer | H04L 12/6418 370/356 |
| 2002/0099552 A1* | 7/2002 | Rubin | G09F 27/00 704/270 |
| 2006/0013416 A1* | 1/2006 | Truong | H04M 3/568 381/119 |
| 2006/0161430 A1* | 7/2006 | Schweng | G10L 25/78 704/233 |
| 2006/0182268 A1* | 8/2006 | Marton | H04M 9/082 379/406.08 |
| 2008/0037513 A1* | 2/2008 | Gerding | H04L 12/6418 370/352 |
| 2009/0304198 A1* | 12/2009 | Herre | G10L 19/008 381/66 |
| 2010/0142722 A1* | 6/2010 | Von Wiegand | H04R 27/00 381/77 |
| 2011/0095875 A1* | 4/2011 | Thyssen | G09G 5/10 340/407.1 |
| 2015/0334247 A1* | 11/2015 | Van Der Schaar | H04M 3/568 379/202.01 |
| 2016/0028896 A1* | 1/2016 | Schellekens | H04R 3/005 370/260 |

FOREIGN PATENT DOCUMENTS

| | | |
|---|---|---|
| JP | 2006304032 A | 11/2006 |
| JP | 2009141400 A | 6/2009 |
| WO | 2011009483 | 1/2011 |

* cited by examiner

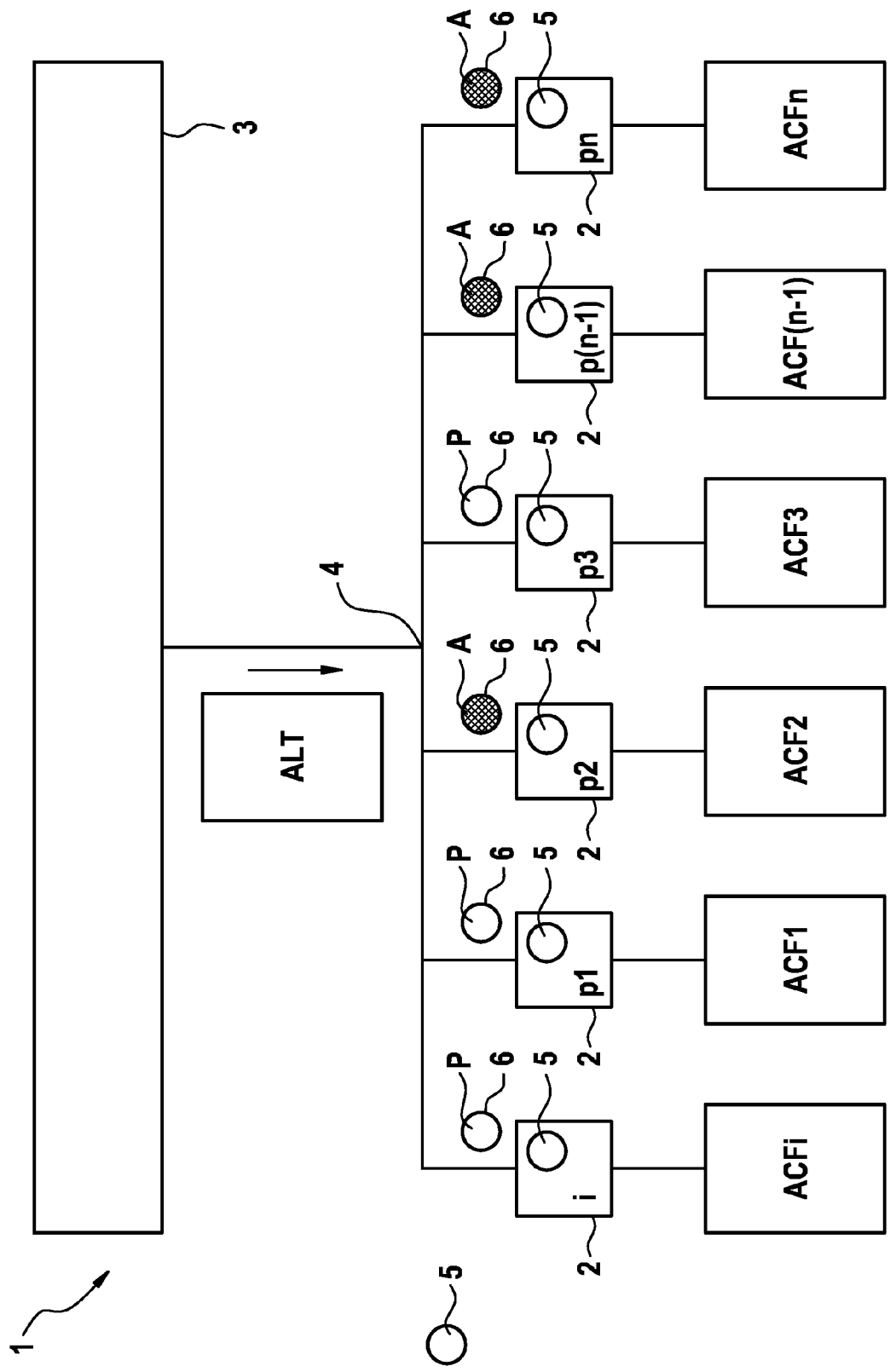

CONFERENCE SYSTEM AND PROCESS FOR VOICE ACTIVATION IN THE CONFERENCE SYSTEM

BACKGROUND OF THE INVENTION

The invention relates to a conference system. More specifically the invention relates to a conference system comprising a plurality of delegate units, each delegate unit having a microphone for receiving an audio signal from a surrounding and a central service module handling a plurality of contribution channels, whereby the audio output of the contribution channels contribute to an amplified audio output of the conference system, whereby each delegate unit is adapted to transmit a request for a contribution channel commit to the central service module, whereby the service module is adapted to grant the request and to allocate a contribution channel to the requesting delegate unit, thus setting the requesting delegate unit in an active state. Further the invention relates to a process for voice activation in the conference system.

Conference systems are used for example in discussions and usually comprise a plurality of delegate units with microphones, whereby in a discussion each discussion participant uses his own delegate unit. Usually the delegate units have a switch or the like, that allows the participant in front of the delegate unit to request, that his microphone is activated, so that the speech of the participant is input in the conference system and amplified by the conference system.

For example, the document EP 1 686 835 A1, probably representing the closest prior art, discloses a conference system with a plurality of such delegate units, whereby various indicators are placed on the delegate unit for indicating different states of the delegate unit.

SUMMARY OF THE INVENTION

According to the invention a conference system is provided, which is operable to be installed in a conference room or in a plenary hall and is for example used by politicians or other participants discussing with each other. The conference system can also be titled conference arrangement.

The conference system comprises a plurality of delegate units. Preferably more than 50, especially more than 100 delegate units are used in the conference system. Each delegate unit has a microphone for receiving an audio signal from a surrounding. The audio signal is especially a speech signal from a participant standing or sitting in front of the delegate unit and thus in front of the microphone. Preferably the delegate unit is embodied as a table top unit having a base body optionally with or without a loudspeaker, whereby the microphone is arranged on the base body. For processing data it is preferred, that the delegate unit comprises a local processing unit, preferably integrated in the base body.

The conference system furthermore comprises a central service module, which is operable to handle a plurality of contribution channels, especially amplifying channels, whereby the audio output of the contribution channels are contributing to an amplified audio output of the conference system. The amplified audio output of the conference system is the resulting audio atmosphere provided by the conference system in the surrounding. Preferably the conference system is operable to amplify audio signals from the delegate units to amplified audio signals by using the contribution channels, whereby the amplified audio signals are a part of the audio atmosphere, for example in the plenary hall or meeting room.

Each delegate unit is adapted to send or transmit a request for a contribution channel commit to the central service module. With the request the delegate unit asks to be connected with one of the contribution channels in order to transmit the own audio signal to the contribution channel, so that the audio signal is amplified and forms a part of the amplified audio output and thus a part of the audio atmosphere. The central service module is adapted to grant the request and to allocate one of the contribution channels to the requesting delegate unit. With this procedure the requesting delegate unit is set in an active state and changes its status from a passive delegate unit to an active delegate unit.

The central service module may be embodied as a computer, especially as a server. The communication between the central service module and the delegate units is preferably a digital communication, especially using a network protocol, for sending the request and for transmitting the audio signals.

According to the invention, the delegate unit is adapted to trigger the request and consequently the transmission of the request by voice activation. The conference system thus allows, that the delegate units are changed from the passive state to the active state by voice activation. Voice activation means, that a speaker in front of the delegate unit only has to start speaking in order to initiate the trigger of the request. The advantage of the voice activation mode is, that the participants of the discussions do not have to request contributing to a discussion by pressing a button or the like, but can join the discussion by simply starting to speak. The voice activated method is not only useful for an interactive discussion, but can also be used in other discussion methods to limit the number of channels contributing to the floor audio.

One of the delegate units, which may trigger the request, is called possible requesting delegate unit, whereby each of the delegate units can be such a possible requesting unit. The possible requesting delegate unit is adapted to trigger the request in case at least a first trigger condition is fulfilled, which claims that its audio signal level of the possible requesting delegate unit is higher than an individual test value for each other delegate unit being in the active state. The own audio signal level of the possible requesting delegate unit is the level of the audio signal received by the microphone of the possible requesting delegate unit. For each other active delegate unit an individual test value is estimated or calculated. The individual test value is an estimated or calculated audio signal level of the possible requesting unit resulting from an audio or speech signal provided to the other active delegate units and which was coupled in the microphone of the possible requesting unit.

The underlying idea of the invention is, that in case the delegate units are arranged close to each other, for example with a distance smaller than 1 meter, especially smaller than 60 centimeters, and respecting the fact, that delegate units often have a large dynamic range of the audio-in, the delegate unit cannot determine, if it is either the possible requesting delegate unit or a neighboring delegate unit without additional information. Furthermore room conditions (reflection and reverb) can cause points in the room where audio is accumulated to the level that is falsely recognized as a speaker.

By performing the testing of the first trigger condition, the possible requesting delegate unit tests whether the own audio signal is received from a speaker or participant speaking in the own microphone or a speech signal is received from a speaker or participant speaking into a neighboring delegate unit. In that case the individual test value of that neighboring delegate unit would be higher than the own audio signal level and the possible requesting delegate unit concludes that it shall not be voice-activated. Therefore the possible requesting delegate unit tests whether the first trigger condition is true or false.

The individual test value for a test delegate unit is preferably estimated, especially calculated by multiplying an individual acoustical coupling factor, which is defined for each pair of the possible requesting delegate unit and test delegate unit, with the audio signal level of the test delegate unit during the test period and optionally with a threshold factor. So for each pair (possible requesting delegate unit<-> test delegate unit) an individual acoustic coupling factor is defined. The audio signal level of the test delegate unit is defined as the level of the audio signal received from the microphone of the respective test delegate unit. The test period is preferable shorter than 1 sec., especially shorter than 0,1 sec. Preferably only the active delegate units are evaluated as test delegates.

In an alternative embodiment of the invention, the maximum of the audio signal levels of the test delegate for the few last time periods is used instead of the audio signal level of the present test period. For example at least the last 3, 5 or 10 time periods are used to determine the maximum. This alternative improves the robustness of the value and thus the robustness of the voice activation.

In a further development of the invention, the individual test value is updated for a block of samples, for example a block of 1024 samples by a frequency of 48 kHz sampling rate, so that the individual test value is updated all 21 ms. Other values for the sampling rate and the block length can be used. It is further preferred that the test of the first trigger condition is performed for every sample. So for the above-mentioned example, the test is performed every 1/48000 s.

The individual acoustical coupling factor describes or is representative for the ratio between the audio signal level of the possible requesting delegate unit and the audio signal level of the test delegate unit in case a speech signal is generated from a speaker using the test delegate unit. In other words the individual acoustical coupling factor can be derived in the situation a speaker speaks into the microphone of the test delegate unit, whereby the audio signal of the possible requesting delegate unit is divided by the audio signal level of the request delegate unit to retrieve the acoustical coupling factor. In other words, the acoustical coupling factor describes the ratio what the microphone of the possible requesting delegate unit and the microphone of the test delegate unit receives from the speech signal.

The conference system is also tolerant in case the possible requesting delegate unit receives an audio signal from its own or another loudspeaker. In this case, the individual acoustical coupling factor will actually also converge to the audio from the loudspeaker, thereby preventing that a request is triggered by the loudspeaker signal. This is possible, because it is known which (active) delegate units are contributing on the loudspeaker signal. To reduce the local speaker to microphone coupling it is possible to implement an short-acoustic echo canceller, which filters the signal of the delegate units loudspeaker from its microphone signal.

In a preferred embodiment each delegate unit comprises a factor table containing individual IDs of the other delegate units (comprising active and passive delegate units) and the individual coupling factors. It shall be underlined, that the factor tables of the various delegate units are different to each other. Furthermore the delegate unit comprises an audio signal level table containing individual IDs of the other delegate units, which are in an active state, and the audio signal level during the test period. With these two tables the possible requesting delegate unit is able to perform the test concerning the first trigger condition.

In a preferred realization of the invention the factor table is managed by the delegate units and is preferably filed in the delegate unit. For example the delegate units have a memory for filing the factor table. The audio signal level table is provided by the central service module. As the audio signal level table must be updated for each test period, the audio signal level table can for example be distributed to the delegate units by broadcast or multicast distribution methods.

In a possible improvement of the invention the delegate unit is adapted to estimate the individual acoustical coupling factors for each of the other delegate units in an iterative manner, whereby in each iteration step a start value of the individual acoustical coupling factor is improved. In a possible realization all individual coupling factors are set at 1.0=0 dB during installation or initialization of the conference system. As soon as a situation is created for estimating the individual coupling factors, a next iteration step is performed. Such a situation is given only one speaker uses one delegate unit of the conference system. In this situation the individual coupling factors of all other delegate units relating to the used delegate unit can be improved in an iterative step. Therefore the conference system is self-learning and thus self-optimizing over the time.

In a further possible improvement of the invention one of the delegate units, which requested a contribution channel on basis of the data of a first test period and which was dedicated to a contribution channel by allocating the contribution channel to the delegate unit, is adapted to review the request and thus the allocation by re-testing at least the first trigger condition on basis of the data of a second test period. The underlying idea of this improvement is the following situation: For example three delegate units arranged adjacent to each other are in a passive state during the first test period and all three receive the same speech signal. In this situation it might happened, that all three delegate units trigger a request as described above, as the three delegate units are in a passive state and do not test themselves against each other. After each of the three delegate units is allocated to a contribution channel, the first condition is re-tested on basis of the data of a second test period, preferably following after the first test period, especially being the next test period after the first test period. During the second test period, the three delegate unit are in the active state. By testing the first trigger condition on basis of the data of the second test period, two of the three delegate units will test the first trigger condition as false, because the three delegate units now test the first trigger condition against each other.

In a further improved embodiment of the invention it is claimed, that the delegate unit is adapted to trigger the request in case at least the first trigger condition and a second trigger condition is fulfilled, whereby the second trigger condition defines, that the audio signal level of the possible requesting delegate unit is higher than a reference noise level during the test period. The data of the noise level is preferably provided by the central service module and especially provided together with the audio signal level table.

A further possible improvement to prevent the grant of requests of two delegate units resulting from the same speech signal is that the central service module is adapted to grant only one request during a pre-selected dead-time. Returning to the previous example, all delegate units will send their requests in a very short time window. The central service module will grant only the first request and will deny the other to requests during the dead-time.

In a further improvement of the invention the delegate unit comprises a speaker indication device for indicating a speaker status of the delegate unit, whereby the speaker indication is activated in case the delegate unit is in the active state as a first indication condition and under a second indication condition that a voice pitch is detected. With this improvement it is secured that the indication device will only be activated if the triggering audio signal is a speech signal.

BRIEF DESCRIPTION OF THE DRAWINGS

Further features, advantages and details of the invention will become apparent by the description of an embodiment of the invention. The figure show:

FIG. 1 a block diagram of a conference system as an embodiment of the invention.

DETAILED DESCRIPTION

FIG. 1 shows an schematic overview of a conference system 1 as an embodiment of the invention. The conference system 1 comprises a plurality of delegate units 2 additionally labeled with the letters i, p1, p2, p3, p(n−1), pn and a central service module 3, which are connected with the delegate units 2 by a network 4. The central service module 3 maybe embodied as a computer server or another server or may form a separate module to a server.

Each of the delegate units 2 comprises a microphone 5 for receiving a speech signal from a speaker or a participant of a discussion. The central service module 3 is organizing a plurality of contribution channels, whereby the contribution channels are amplifier channels, so that an audio signal, which is sent from the delegate unit 2 to one of the contribution channels will be amplified and emitted as an amplified audio signal to a surrounding.

The conference system can for example be installed in a plenary hall, whereby each plenary seat is equipped with one of the delegate units 2. During a discussion in the plenary hall a participant of the discussion using one of the delegate units can speak into the microphone 5 of the delegate unit 2 so that an audio signal is received by the delegate unit 2. The audio signal is transmitted to the contribution channel, amplified and emitted in the plenary hall, so that the other participants can hear the audio signal.

In order to have a well regulated discussion, some of the delegate units 2 are in an active state A and allowing the participant to speak in the discussion and some of the delegate units 2 are in a passive state P, whereby the audio signal is not amplified and emitted in the floor. In case the delegate units 2 are in the active state A one of the contribution channel is allocated from the central service module to the delegate unit 2.

During operation the delegate units 2 are switched from the passive state P to the active state A by a voice activation method as explained below:

Each delegate unit 2 in a passive state P requests a contribution channel commit when a first and optional a second trigger condition are fulfilled:

The first trigger condition is a directional noise condition: The input audio signal level of the possible requesting delegate unit 2 is well above the estimated coupled-in audio level, i.e. is well above the estimated audio signal level resulting from receiving a speech signal from a speaker using another delegate unit 2.

The second trigger condition is a diffuse noise condition: The input audio signal level of the possible requesting delegate unit 2 is well above a reference level (e.g. the floor background noise level).

The data, which will also be referred to as audio metadata, required as external information for each delegate unit 2 to determine the above two conditions is (1) a table ALT of all delegate units 2 in the active states which their unique identification IDs and their audio signal level during a test period T and (2) the reference (background noise) level N. The table ALT may for example have the structure:

p2 level $X_{p2}(T)$
p(n−1) level $X_{p(n-1)}(T)$
pn level $X_{pn}(T)$
Noise level N whereby p2, p(n−1), pn represent the ID and level $X_{p\#}$ the audio signal level during the test period T. The noise level N will be explained later.

In a possible, not limiting implementation the level is a value within a range [0, 1] described by a 16-bit unsigned integer. For calculating the level the audio levels are determined during a block of samples, for example during 1024 samples. For each sub-block of 32 samples the root mean square is calculated and the result is put into an exponential averaging filter. For the noise level the level is calculated using an algorithm (for example spectral noise density) on the floor audio (which is a mix of all contribution channels).

The audio metadata is collected and distributed by the central service module 3. From a practical point of view it is sufficient to only periodically distribute the audio metadata, for instance every 1024 samples for saving communication band width. The audio metadata can be distributed efficiently by using broadcast or multicast distribution methods.

When a contribution channel request is received, the central service module 3 grants assignment of the contribution channel if one is available. If all contribution channels are occupied it replies with a deny response. If the delegate unit 2 in the active state A no longer fulfils either of the conditions, it requests release of the contribution channel after a time-out period. The time-out period prevents that a release is requested due to a small pause in the speech. A contribution channel commit or release always has to be requested from the central service module 3, because requirements could exist which would result in a denial. E.g. the requirement that at least one delegate unit 2 should always remain active.

The first trigger condition can be seen in the following equation:

$$X_i(k) > \gamma_{dir} \max_{p \in P(\kappa B)} \{W_{p,i}(\kappa B) X_{p,max}(\kappa B)\}$$

with:
k Discrete time
B Block with a block length of a plurality of samples, for example 1024 samples, defining the length of the time or test period;
K discrete time-frame index for the B block periods.

$X_{p,max}(KB)$ the maximum audio signal level of the delegate unit p for the last few, for example the last 3 to 10 time periods before the time period k $X_i(k)$ the audio level of the possible requesting delegate unit i during the time period k;

$\gamma_{dir}$ threshold factor for this condition;

P the collection of delegate units 2 in the active state A during the time period k;

$W_{p,i}(KB)$ the acoustical coupling factor between the delegate unit p and the delegate unit i during the time period k.

The first trigger condition therefore tests whether the audio signal level of the delegate unit i as the possible requesting delegate unit is higher than a reference test value of each the other active delegate units p multiplied with the threshold factor. The function max serves as a pre-selecting, because it extracts the highest reference test value. The reference test value is therefore the product of the maximum audio signal level of the delegate unit p during the time period k and the coupling factor between the test delegate unit p and the possible requesting delegate unit i during the time period k.

The individual acoustical coupling factor $W_{p,i}(KB)$ describes the ratio between the audio signal level $X_i$ of the possible requesting delegate unit i and the audio signal level $X_i$ of the test delegate unit p in case a speech signal is generated from a speaker using the test delegate unit p. So the individual acoustical coupling factor can be different from each other for each test delegate unit p. The first trigger condition will be fulfilled if the speech signal is provided by a speaker being in front of the microphone 4 of the possible requesting delegate unit i and not in front of the test delegate unit p.

In a possible implementation, block length "B" is the 1024 sample interval. "k" is the discrete time, dependent on the sampling frequency. At least the first, preferably both trigger conditions are actually evaluated every sample period: first the audio level X is updated using the latest sample preferably using exponential averaging, next the comparison is made. Else wise a for example 1024 sample worst-case delay would cause the system to possibly miss the first letters of the speakers sentence. The test values $W_{p,i}(\kappa B)X_{p,max}(\kappa B)$ are and the noise value (N) is only updated when new audio metadata is received (, which occurs every block B).

The individual acoustical coupling factors $W_{p,i}(KB)$ are estimated and are achieved using a standard normalized least means squared algorithm. Its target is to quickly converge filtering coefficients to minimize the error (=residual level). Again the time period KB is used for description.

In a first step, a residual level $R_{p,i}$ is determined from the delegate unit p to the delegate unit i, whereby the delegate unit p is the only delegate unit 2 in the active state A. In the situation where only a single delegate unit p is active, all other delegate units 2 dynamically adjust their acoustical coupling factor estimation to the active delegate unit p, using the audio signal level of their microphone 4 input and the audio signal level of the single active delegate unit p, whereby the audio signal level of the single active delegate unit p is distributed to all delegate units 2 by the central service module 3.

$$R_{p,i}(\kappa B) = X_i(\kappa B) - W_{p,i}(\kappa B)X_{p,max}(\kappa B)$$

In a next step, the acoustical coupling factor is updated:

$$W_{p,i}([\kappa+1]B) = W_{p,i}(\kappa B) + \mu \frac{R_{p,i}(\kappa B)X_{max,p}(\kappa B)}{\max(\varepsilon\{[X_{p,max}(\kappa B)]^2\}, \varepsilon\{[R_{p,i}(\kappa B)]^2\}, thr)}$$

with:

$W_{p,i}(\kappa B)$ the updated acoustical coupling factor from the delegate unit p to the delegate unit i;

$\mu$ the converging-rate time constant $\varepsilon\{\ \}$ an exponential averaging function;

thr a "bottom" threshold to prevent spikes during initialization.

As a start value, all acoustical coupling factors W could be set to the value 1.0=0 dB.

A possible implementation for the exponential averaging function is defined as:

$$X_i(k) = \beta X_i(k-1) + (1-\beta)|x_i(k)|$$

where smoothing-factor beta is determined using:

$$\beta = \exp\left[\frac{-1}{T_{exp}F_s}\right]$$

With:

$T_{exp}$ the exponential time constant $F_s$ the sampling frequency.

Other known implementations could be used.

The exponential (moving) average function is described above, but for the $\varepsilon\{\ \}$-functions (determining the average power level) it is performed on the square of the input and the update rate is for each block period KB. Lets refer to $\varepsilon\{X_{p,max}(\kappa B)^2\}$ as $P_{xx,p}(KB)$. Then:

$$P_{xx,p}(\kappa B) = \beta P_{xx,p}([\kappa-1]B) + (1-\beta)X_{p,max}^2(\kappa B)$$

As the input for this function is the maximum level of the past for example 5 blocks, and this level is determined by the exponential averaging function of the audio, this seems double work, but this smoothing is preferred for the NLMS algorithm to converge quickly. The other value $P_{rr,p,i}(KB) = \varepsilon\{R_{p,i}(\kappa B)^2\}$ is advantageous to react to external disruptions of the algorithm, e.g.: In a system where only one delegate unit is active, the coupling factor to that delegate unit are being updated. If the speaker behind a non-active delegate unit would start speaking, that delegate unit would send a request. However, it will take up tens of milliseconds for the system to grant this request: in the mean time the speech of the speaker can cause the coupling factor to be updated using incorrect input. However, due to the large error/residual signal, the $P_{rr,p,i}(KB)$ will quickly rise, preventing fast update of the coupling factors.

As a result, each delegate unit 2 keeps a table containing the acoustical coupling factors estimations to each other delegate unit 2. The acoustical coupling factor tables are indicated in FIG. 1 with ACFi, ACF1, ACF2 . . . ACFn.

The second trigger condition, i.e. the diffuse noise condition can be seen in the next equation:

$$X_i(k) > \gamma_{dif}N(\kappa B)$$

with:

$\gamma_{dif}$ the threshold factor for this condition

N the reference (background noise) level (from ALT).

Because the conference system 1 is a distributed System, delays and latencies in communication can occur, which may be handled as follows.

Before a speaker's delegate unit 2 is granted a contribution channel, others delegate units 2 also request a channel commit due to acoustical coupling. Therefore only the first commit request is granted, where-after all commit requests are denied for a certain amount of time (called 'dead time'). This dead time should be long enough so that the distributed metadata contains information on the speaker's delegate unit 2.

To prevent a flood of re-requests, a delegate unit 2 must wait for a period of time before sending a new request, after the previous request has been denied.

Because the metadata is only send once every x samples, the last known information may lag behind. In that case, it cannot be prevented that an onset in the speaker's voice triggers a commit at one or more delegate units 2 (this occurs more often when the coupling estimations have converged to their final value). To solve this, a delegate unit 2 waits for a metadata update directly after their channel commit request has been granted: If it is clear from the new metadata that the commit request was triggered by acoustical coupling, the delegate unit 2 immediately requests a channel release (i.e. without time-out period).

Voice Detection/Identification:

In the conference system 1 a delegate unit 2 could still request and receive a contribution channel due to a disturbance (pen click, cough, etc). This is acceptable, because the channel is quickly released. The delegate unit 2 comprises an indication device 6, indicating with a light or LED the active or passive state of the delegate unit 2. However: for a discussion it would be preferred to only indicate a real speaker to the public by activating indication device on the delegate unit 2. In a possible embodiment it is proposed to separate the indication from the channel assignment.

The indication device 6 on a delegate unit 2 with contribution channel assigned. i.e. in the active state A, is activated as soon as voice (pitch) is detected on its audio signal. To limit processing requirements, it will be sufficient to perform the voice (pitch) detection on the loudest contribution channel only. It is also preferred to perform the voice (pitch) detection at the central service module 3, to reduce hardware requirements on the delegate units.

Possible advantages of the discussion system 1 are that the acoustic coupling between the delegate units 2 are dynamically determined. It requires limited information to be distributed, with which the delegate units 2 can determine if they have a real speaker as audio input. It can handle communication delays in information exchange. These improvements allow the conference system 1 to be flexible and scalable. The conference system 1, especially the voice activation, is very robust, because neighboring delegate units 2 don't activate or are only activated very shortly due to acoustical coupling when a speaker starts to speak. The conference system 1, especially the delegate units 2, are self-learning, whereby after a short period, it is easy for other speakers to participate to the discussion, even at the neighboring devices. The conference system 1 is scalable, because the conference system 1 is working in small and in very large setups, without requiring manual configuration. The communication overhead is low, because of the use of periodic metadata, for instance distributed using broadcast or multicast. Summarized, the conference system 1 improves robustness and flexibility by determining acoustical coupling and optionally speak-conditions at the delegate units 2.

Then invention claimed is:

1. A conference system comprising (1)
  a plurality of delegate units (2), each delegate unit (2) having a microphone (5) for receiving an audio signal from a surrounding, and
  a central service module (3) handling a plurality of contribution channels, whereby the audio output of the contribution channels contribute to an amplified audio output of the conference system (1),
  whereby each delegate unit (2) is configured to send a request for a contribution channel commit to the central service module (3), whereby the central service module (2) is configured to grant the request and to allocate a contribution channel to the requesting delegate unit (2), thus setting the requesting delegate unit (i) in an active state (A), and
  wherein the delegate unit (2) is configured to trigger the request by voice activation, whereby the request is triggered in case at least a first trigger condition is fulfilled defining that the audio signal level of one of the delegate units (2) as a possible requesting delegate unit (i) is higher than an individual test value for each other delegate unit (2) in the active state (A), whereby the individual test value is an estimated audio signal level of the possible requesting unit (i) resulting from an audio or speech signal provided to the other active delegate units (2).

2. The conference system (1) according to claim 1, characterized in that the individual test value for a test delegate (p) unit is derived by multiplying an individual acoustical coupling factor between the possible requesting delegate unit (i) and the test delegate unit (p) with the audio signal level of the test delegate unit (p) during the test period and optionally with a threshold factor.

3. The conference system (1) according to claim 1, characterized in that the individual test value for a test delegate (p) unit is derived by multiplying an individual acoustical coupling factor between the possible requesting delegate unit (i) and the test delegate unit (p) with the maximum of the audio signal level of the test delegate unit (p) during the last few test periods and optionally with a threshold factor.

4. The conference system (1) according to claim 2, characterized in that each delegate unit (2) comprises a factor table (ACF) containing individual IDs of the other delegate units and the individual coupling factors and an audio signal level table (ALT) containing individual IDs of the other active delegate units (2) and the audio signal level during the test period.

5. The conference System (1) according to claim 4, characterized in that the factor table (ACF) is managed by and/or filed in the delegate units (2) and that the audio signal level table (ALT) is provided by the central service module (3).

6. The conference system (1) according to claim 2, characterized in that the delegate unit (2) is adapted to estimate the individual acoustical coupling factors for each of the other delegate units (2) in an iterative manner, whereby in each iteration step a start value of the individual acoustical coupling factor is improved.

7. The conference system (1) according to claim 2, characterized in that the delegate unit (2), which requested a contribution channel on basis of the data of a first test period (KB) and which was dedicated to a contribution channel by allocating the contribution channel to the delegate unit (2), is configured to review the request and thus the allocation by re-testing at least the first condition on basis of the data of a second test period ((k+1)B).

8. The conference system (1) according to claim 2, characterized in that the delegate unit (i) is configured to trigger the request in case at least the first trigger condition and a second trigger condition is fulfilled, whereby the second trigger condition claims that the audio signal level of the possible requesting delegate unit (p) is higher than a reference noise level (N) during the test period.

9. The conference system (1) according to claim 2, characterized in that the central service module (3) is configured to grant only one request during a pre-selected dead-time.

10. The conference system (1) according to claim 1, characterized in that the delegate unit (2) comprises a speaker indication device (6) for indicating an speaker status of the delegate unit (2), whereby the speaker indication device (6) is activated in case a first indication condition is fulfilled, that claims that the delegate unit (2) is in an active state and under a second indication condition that claims that a voice is detected.

11. A process for voice activation in the conference system (1) according to claim 1, characterized in that the delegate unit (2) triggers the request by voice activation, in case at least a first trigger condition is fulfilled defining that the audio signal level of one of the delegate units (2) as a possible requesting delegate unit (i) is higher than an individual test value for each other delegate unit (2) in the active state (A), whereby the individual test value is an estimated audio signal level of the possible requesting unit (i) resulting from an audio or speech signal provided to the other active delegate units (2).

12. The conference system (1) according to claim 3, characterized in that each delegate unit (2) comprises a factor table (ACF) containing individual IDs of the other delegate units and the individual coupling factors and an audio signal level table (ALT) containing individual IDs of the other active delegate units (2) and the audio signal level during the test period.

13. The conference system (1) according to claim 1, characterized in that the delegate unit (2) comprises a speaker indication device (6) for indicating an speaker status of the delegate unit (2), whereby the speaker indication device (6) is activated in case a first indication condition is fulfilled, that claims that the delegate unit (2) is in an active state and under a second indication condition that claims that a voice pitch is detected.

* * * * *